United States Patent [19]

Yoshiura

[11] Patent Number: 5,025,497
[45] Date of Patent: Jun. 18, 1991

[54] FACSIMILE APPARATUS CONNECTED TO DATA COMMUNICATION NETWORK HAVING TIME-SAVING CAPABILITY

[75] Inventor: Yoshio Yoshiura, Ninomiya, Japan

[73] Assignee: Canon Kabushiki Kaisha, Tokyo, Japan

[21] Appl. No.: 326,447

[22] Filed: Mar. 22, 1989

Related U.S. Application Data

[63] Continuation of Ser. No. 940,497, Dec. 10, 1986, abandoned.

[30] Foreign Application Priority Data

Dec. 17, 1985 [JP] Japan .................................. 60-283992

[51] Int. Cl.$^5$ .............................................. H04N 1/32
[52] U.S. Cl. ....................................... 358/425; 370/94
[58] Field of Search ....................... 358/256, 257, 258; 370/60, 94; 340/825.5, 825.51, 825.52

[56] References Cited

U.S. PATENT DOCUMENTS

| | | |
|---|---|---|
| 4,058,838 | 11/1977 | Crager et al. ........................ 358/425 |
| 4,361,848 | 11/1982 | Poignet et al. ................... 358/425 X |
| 4,430,651 | 2/1984 | Bryant et al. ..................... 370/94 X |
| 4,539,676 | 9/1985 | Lucas ................................. 370/94 X |
| 4,569,041 | 2/1986 | Takeuchi et al. ................. 370/94 X |
| 4,603,416 | 7/1986 | Servel et al. .......................... 370/60 |
| 4,646,160 | 2/1987 | Iizuka et al. ......................... 358/257 |
| 4,677,616 | 6/1987 | Franklin ................................. 370/94 |
| 4,679,189 | 7/1987 | Olson et al. ...................... 370/94 X |
| 4,692,717 | 9/1987 | Fujioka ................................. 370/60 |
| 4,706,126 | 11/1987 | Kondo ............................ 358/256 X |
| 4,771,335 | 9/1988 | Obara ............................. 358/425 A |

FOREIGN PATENT DOCUMENTS

| | | | |
|---|---|---|---|
| 0037603 | 3/1979 | Japan .................................. 358/256 |
| 0038055 | 3/1982 | Japan .................................. 358/256 |
| 1256631 | 12/1971 | United Kingdom . | |
| 2015304 | 9/1979 | United Kingdom . | |

Primary Examiner—James J. Groody
Assistant Examiner—Victor R. Kostak
Attorney, Agent, or Firm—Fitzpatrick, Cella, Harper & Scinto

[57] ABSTRACT

A data transmitting apapratus has: a plurality of terminals such as image readers, each for reading original image data and transmitting the image data; a memory for storing the image data from the terminals; a frame processor for producing the frame data from the data stored in the memory; and a controller for transmitting the frame data to the line. A data receiving apparatus has: a plurality of terminals such as word processors, work stations, printers, display devices for outputting the reception data; a circuit for setting an identification number (ID) to each terminal; a controller for receiving the data sent from the line; a decoder for decoding the data received by the controller; a memory for storing the decoded data; amd a circuit for outputting the data stored in the memory to the terminal of the designated ID through the line. Each image reader and each ID have a logical channel group number and logical channel number which are set by a table. With this data communication system, the data transmission and reception can be simultaneously performed, the use efficiency of the system can be improved, and wasted or unnecessary communication time can be eliminated.

15 Claims, 6 Drawing Sheets

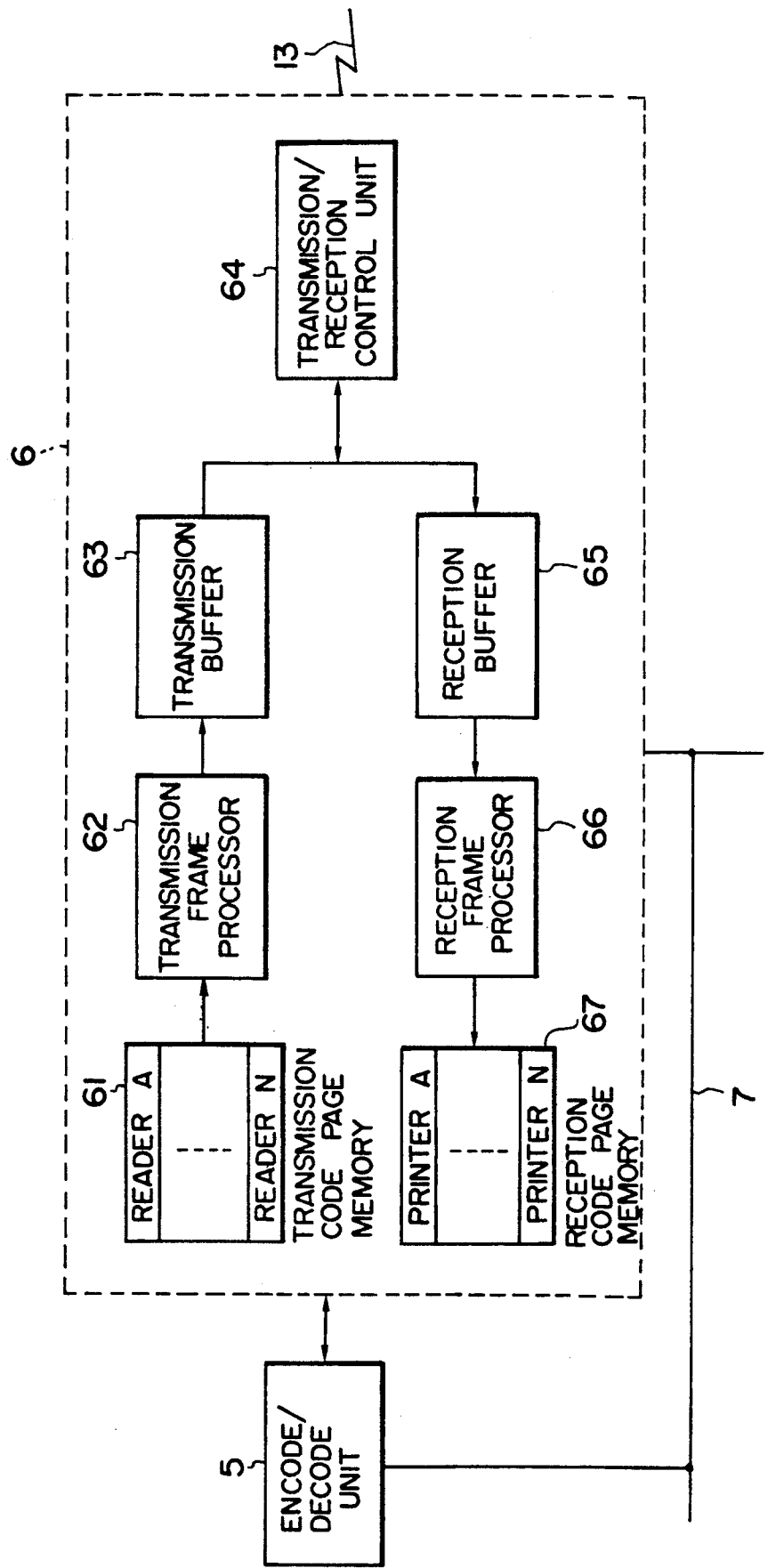

FACSIMILE APPARATUS CONNECTED TO DATA COMMUNICATION NETWORK HAVING TIME-SAVING CAPABILITY

This application is a continuation of application Ser. No. 940,497 filed Dec. 10, 1986, now abandoned.

BACKGROUND OF THE INVENTION

1. Field of the Invention

The present invention relates to a data communication apparatus for transmitting and receiving image data and character code data.

2. Related Background Art

FIG. 1 shows an example of a constitution of a conventional facsimile apparatus.

Reference numeral 1 denotes a reader; 2 is a memory; 3 a printer; 4 a main unit; 5 an encode/decode unit; 6 a line control unit; 7 a control line; 8 to 12 image data lines; and 13 a packet switch network. The operation of a general facsimile apparatus of this conventional example will now be schematically explained.

Upon transmission, the reader 1 is actuated by the main unit 4 and the image data of the original which was photoelectrically read by the reader 1 is stored into the memory 2 through the data line 8. The stored image data is read out under control of the main unit 4 and supplied to the main unit 4 through the data line 10. This data is further transmitted to the encode/decode unit 5 through the data line 11. The transmitted data is encoded by the encode/decode unit 5 in response to a start signal from the control line 7. The encoded data is transmitted through the data line 12 and stored in a transmission buffer in the line control unit 6. The line control unit 6 adds a header to the buffer data on the basis of parameters and the like which are input from the control line 7 and transmits the buffer data onto the packet switch network 13 in a manner such that a proper data length is set to one frame. A data circuit terminating equipment (hereinafter, abbreviated to—DCE) serving as a connecting apparatus with a digital switch network is provided after the packet switch network 13 and connected to the distant apparatus through the switch network.

Upon reception, the image data input from the packet switch network 13 is stored in a reception buffer of the line control unit 6. The line control unit 6 informs the reception of the data to the main unit 4 through the control line 7, thereby actuating the encode/decode unit 5 and allowing the encoded image data which was received from the data line 12 to be decoded. The decoded data is supplied to the main unit 4 through the data line 11 and further written into the memory 2 from the data line 10. When a proper amount of image data has been stored into the memory 2, the printer 3 is made operative by a control signal from the control line 7. The image data is output to the printer through the data line 9 and the image is recorded and reproduced on a recording medium by the printer 3.

In such a conventional apparatus, one terminal is provided with one function as a reader and one function as a printer, so that the reception from a plurality of subscribers cannot be simultaneously performed, and the transmission to a plurality of subscribers cannot be simultaneously performed as well. In addition, there are the drawbacks such that even when the user wants to transmit, if the apparatus is in the receiving mode at this time, he must wait until the data reception is finished and the like, so that even if the line speed is high, this merit cannot be utilized as much as might be desired.

SUMMARY OF THE INVENTION

It is an object of the present invention to remove the foregoing drawbacks.

Another object of the invention is to provide an economical and optimum data communication apparatus to which a plurality of readers and printers, or keyboards and display apparatuses, can be connected.

According to one aspect of the invention, is provided a data transmission apparatus having a plurality of terminals for generating transmission data and means for storing the data from these plurality of terminals, in which the data stored in the memory means can be converted into the frame data and this frame data can be transmitted to the line.

According to another aspect of the invention, is provided a data reception apparatus in which an identification number is set to each of a plurality of terminals for outputting reception data, thereby enabling the data sent from the line to be decoded and subsequently to be output to the terminal of the designated identification number through the line, respectively.

According to further another aspect of the invention, is provided a data transmission/reception apparatus having a plurality of input terminals for receiving transmission data and a plurality of output terminals for outputting reception data, in which the data from the input terminals is converted into the frame data and transmitted to the line, and the data from the line can be decoded and output to the output terminals.

The above and other objects and features of the present invention will become apparent from the following detailed description and the appended claims with reference to the accompanying drawings.

BRIEF DESCRIPTION OF THE DRAWINGS

FIG. 2B is a block diagram showing the details of a line control unit 6 in FIG. 2A;

DETAILED DESCRIPTION OF THE PREFERRED EMBODIMENT

The present invention will be described hereinbelow with respect to a preferred embodiment.

Figure 1:
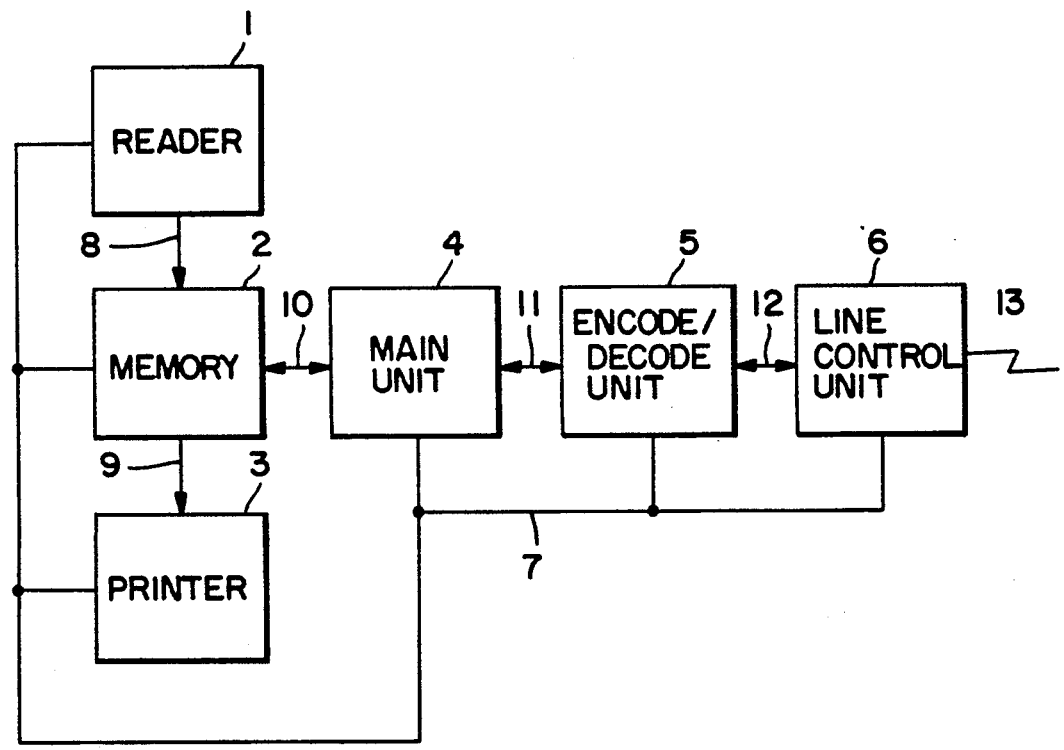
FIG. 1 is a block diagram showing an example of a construction of a conventional facsimile apparatus.
Figure 2A:
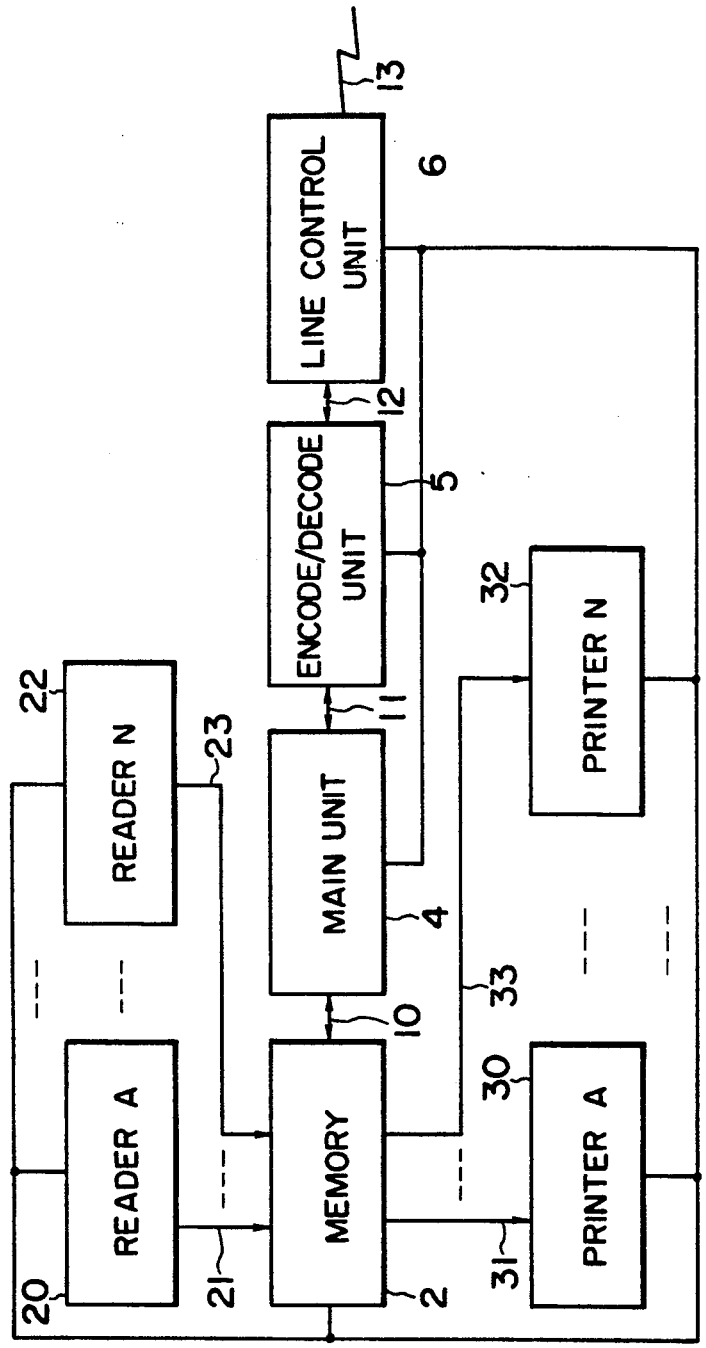
FIG. 2A is a block diagram showing an embodiment of a facsimile apparatus to which the present invention is applied.

FIG. 2A is a block diagram showing an embodiment of a facsimile apparatus to which the invention is applied. Reference numeral 20 denotes a reader A; 21 is an image data line A; 22 a reader N; 23 an image data line N; 30 a printer A; 31 an image data line a; 2 a printer N;

and 33 an image data line n. Numeral 2 denotes the memory; 4 is the main unit; 5 the encode/decode unit; 6 the line control unit; 7 the control line; 10 to 12 the image data lines; and 13 the packet switch network.

Figure 6:
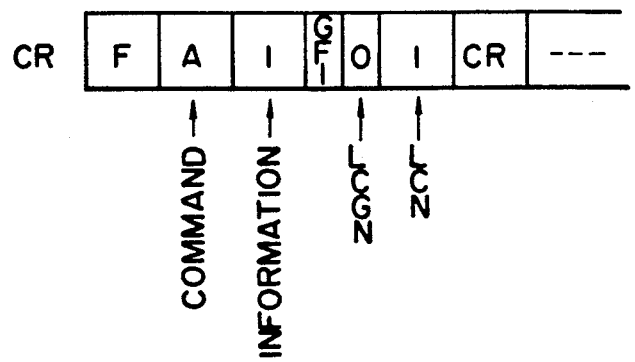
FIG. 6 is a diagram showing an example of an originating call packet (CR)

FIG. 2B is a block diagram showing the details of the line control unit 6 in FIG. 2A. A transmission code page memory 61 stores the data encoded by the encode/decode unit 5 into a predetermined memory area concerned with each of the readers A 20 to reader N 22. A transmission frame processor 62 adds a header as shown in FIG. 6 to the data stored in the transmission code page memory 61 by parameters and the like which are input from the control line 7 and produces the frame data in which a proper length of data is set to one frame. A transmission buffer 63 stores the frame data produced in the frame processor 62. A transmission/reception control unit 64 transmits the frame data stored in the transmission buffer 63 to the packet switch network 13 and transmits the data sent from the packet switch network 13 to a reception buffer 65. The control unit 64 sets the call under the control of the control line 7 or controls the connection such as cutting and the like. The reception buffer 65 stores the frame data sent from the transmission/reception control unit 64. A frame processor 66 rearranges the frame data stored in the reception buffer 65 in accordance with the order of the data transferred from the packet switch network 13 every printer. A reception code page memory 67 stores the frame data sent from the frame processor 66 into the areas in the designated printers, respectively.

First, a logical channel group number (hereinafter, abbreviated to—LCGN) and a logical channel number (hereinafter, abbreviated to—LCN) of the packet switch network will be explained. In the case of the present public packet switch network of Japan, the LCGN is specified to 0 to 1 and the LCN is specified to 1 to 31. The LCN is defined for one LCGN, respectively. Since a call can be set every channel of the LCN, by providing a plurality of LCN for one terminal, i.e., one facsimile apparatus, it is possible to simultaneously perform the communication with a plurality of destinations. Further, the LCGN can be used when it is divided into the group for only reception and the group for only transmission. Therefore, for example, $LCGN_0$ can be defined to be the reader for only transmission; $LCGN_1$ can be defined to be the printer for only reception; the reader A 20 can be set to $LCN_1$, the reader N 22 can be set to $LCN_2$; the printer A 30 can be set to $LCN_1$; and the printer N 32 can be set to $LCN_2$.

Figure 3:
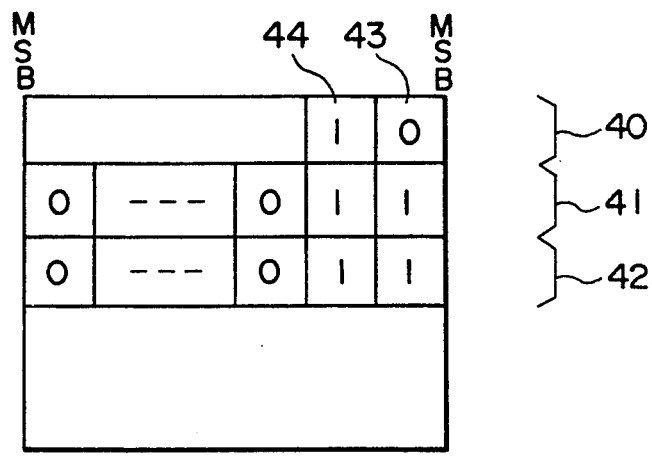
FIG. 3 is a diagram showing a table of LCGN and LCN.

FIG. 3 shows an example of a table provided in the main unit 4. Numeral 40 denotes a status of the LCGN, 41 is a status of the $LCGN_0$, and 42 is a status of the $LCGN_1$. MSB indicates the most significant bit and LSB represents the least significant bit.

Assuming that two readers and two printers are connected, in the table of FIG. 3, numeral 43 denotes $LCGN_0$ and 44 indicates $LCGN_1$. When the use for only the transmission is set to "0" and the use for only the reception is set to "1", the $LCGN_0$ 43 will be "0" and the $LCGN_1$ 44 will be "1". With respect to the statuses 41 and 42, only the portions where the reader and printer are connected are set to "1". Namely, if one reader and one printer are respectively sequentially allowed to correspond to the LCN from the LSB of the statuses 41 and 42, in the case of every two equipment, the status 41 becomes "0—011" and the status 42 also becomes "0—011". When the facsimile apparatus is installed, the foregoing table is initialized in accordance with the constructions of the reader and printer. In this case, in the facsimile apparatus, $LCN_1$ and $LCN_2$ of $LCGN_0$ are contracted with the apparatuses for only the transmission and $LCN_1$ and $LCN_2$ of $LCGN_1$ are contracted with the apparatuses for only the reception.

When an original is transmitted from the reader A 20, for example, when the call is set using $LCN_2$ of $LCGN_0$ and the image is being transmitted, if a reception call comes, it can be terminated from the network by assigning the reception signal to $LCN_1$ of $LSGN_1$. In this manner, $LCN_2$ of $LCGN_0$ and $LCN_1$ of $LCGN_1$ can independently operate, so that the signal can be received to the printer A 30 while transmitting the original image data from the reader A 20. Further, even if another terminating call is simultaneously received, since $LCN_2$ of $LCGN_1$ is empty, the terminating call is assigned to this empty $LCN_2$, so that the printer A 30 can also simultaneously receive the signal.

Figure 4:
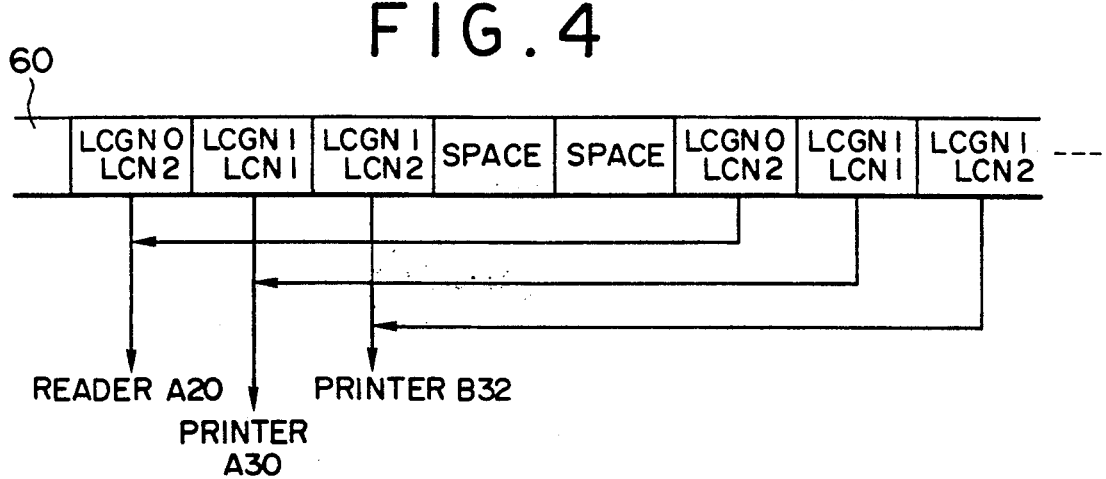
FIG. 4 is a data flowchart.

FIG. 4 shows a data flowchart for the multicontrol in such a case. In FIG. 4, numeral 60 denotes a data flow.

Figure 5:
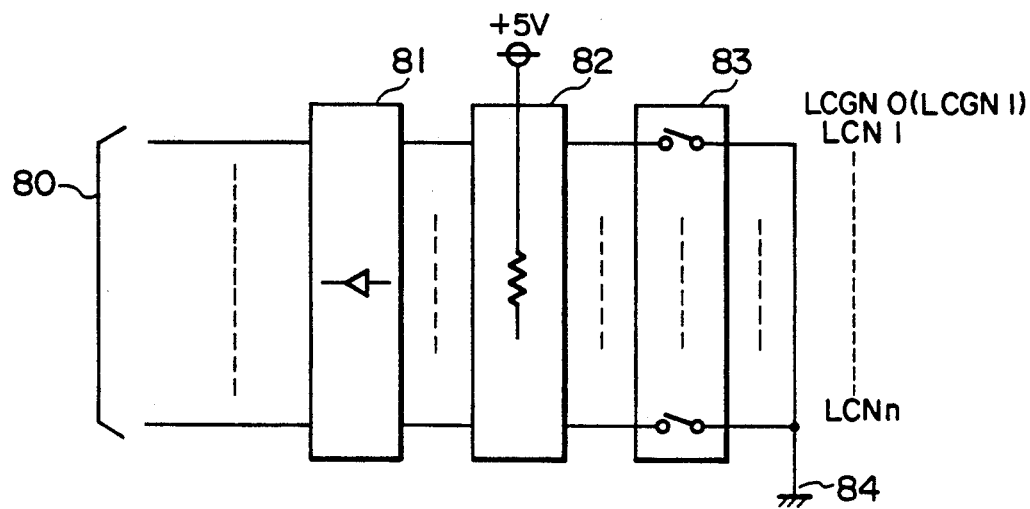
FIG. 5 is a diagram showing a switching input in place of the table in FIG. 3.

The foregoing table in FIG. 3 can be designated by inputting the necessary data from the keys in a software manner when the system is installed. As shown in FIG. 5, the memory in the main unit is not used by each of the LCGN and LCN is allowed to correspond to a switch 83, the apparatus for use of only the transmission is set to "0", the apparatus for use of the reception is set to "1", and the switch 83 is turned on and off in correspondence to them. A buffer gate 81 is turned on through a pull-up resistor 82 and the state may be read out by a microprocessor from a data bus 80. Numeral 84 denotes a grounding line. When the number of bits lacks, a plurality of switches may be used separately for $LCGN_0$ and $LCGN_1$.

The case of transmitting data by the facsimile apparatus shown in FIG. 2 will now be described.

First, an original is set to the reader A 20, the line number of the apparatus on the distant side is set, and the start button is pressed. Then, it is determined to which one of the LCGN and LCN the reader A 20 is allowed to correspond on the basis of the table of FIG. 3. For example, LCGN is set to "0" and LCN is set to "1". Next, an originating call packet (CR) is sent from the transmission control unit 64 to the packet switch network 13 in accordance with an originating call procedure (FIG. 7) of the packet switch network. FIG. 6 shows the originating call packet (CR) in this case. F denotes a flag indicative of a synchronization pattern to obtain the synchronization of the data; A is a command representing that the data is being transmitted from the packet terminal; i an information parameter indicating that parameters subsequently follow; and GFI a general format identifier After that, LCGN and LCN (which are set to "0" and "1" in correspondence to the reader A 20), a CR parameter indicating that this data is the originating call packet (CR), the line number on the terminating call side for transmitting the original image data, the line number on the originating call side, and the like follow.

Figure 7:
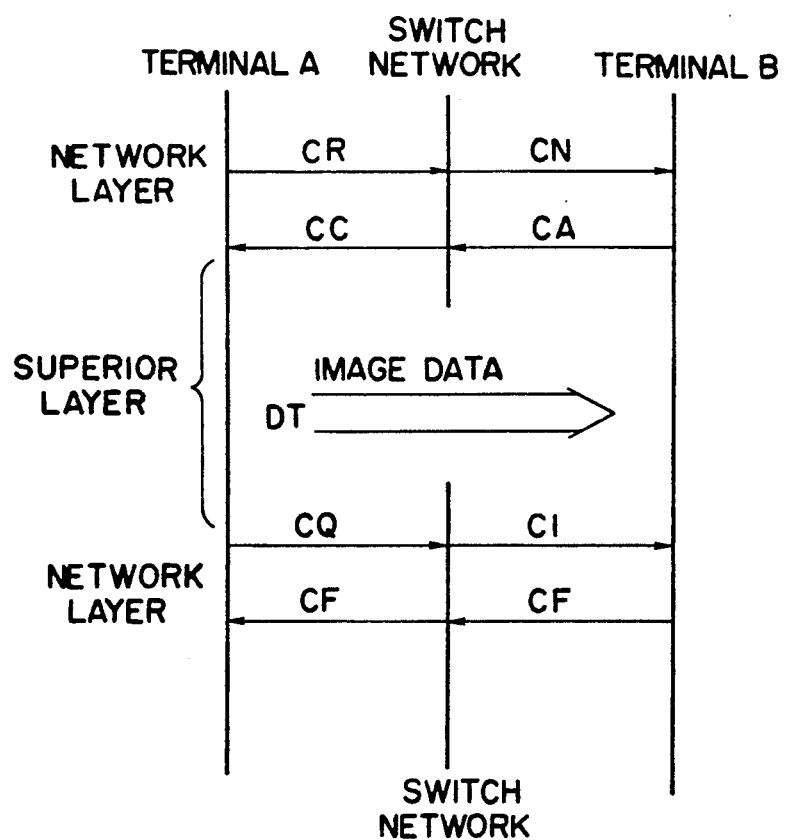
FIG. 7 is a diagram showing a control procedure in a packet switch network.

When the packet switch network receives the originating call packet, it identifies the distant side from the line number on the terminating call side, selects the empty LCGN and LCN which are not used at that time, and transmits a terminating call packet (CN) to inform the distant side terminal that the terminating call came. Assuming that the distant side terminal is the terminal B as shown in FIG. 7, the packet switch network transmits the terminating call packet (CR) to the terminal B.

If the empty channels of the terminal B are LCGN=1 and LCN=2, the subsequent packets are transmitted and received by connecting the LCGN=0 and LCN=1 of the terminal A on the originating call side with the LCGN=1 and LCN=2 of the terminal B on the terminating call side. When the terminal B receives the terminating call packet (CR) and identifies that the printer can be actuated, the terminal B returns the terminating call acknowledgement packet (CA) by the same LCGN=1 and LCN=2 as those of the terminating call packet. The packet switch network then receives the packet (CA), determines that the connection of the terminal B has been finished, and returns a connection completion packet (CC) to the terminal A. In this case, the LCGN and LCN of the packet (CC) are the same "0" and "1" as those of the originating call packet (CR), respectively.

The connection of the network layer is finished in this way and the reader A 20 of the terminal A and the printer of the terminal B are coupled in a one-to-one correspondence manner.

The LCGN and LCN of the DT packet which also includes the image data to be transmitted and received between the terminal A and the switch network have the same values as those of the CR packet. The LCGN and LCN of the DT packet which also includes the image data to be transmitted and received between the switch network and the terminal B have the same values as those of the CN packet.

Figure 8A:
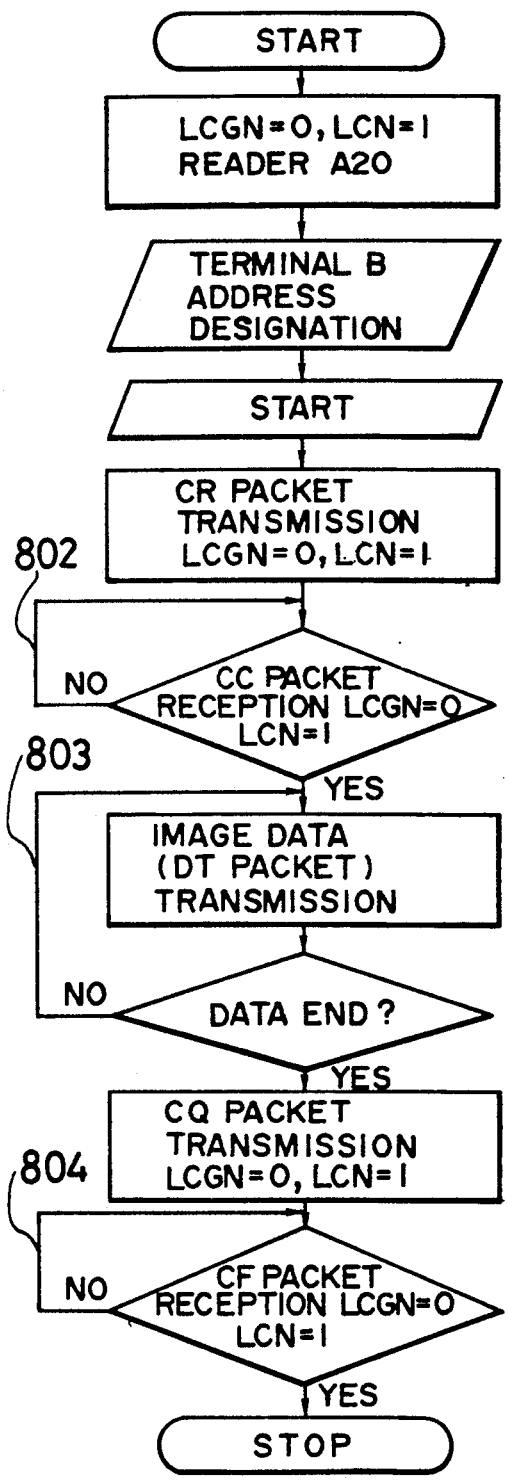
FIG. 8A is a flowchart showing the control upon data transmission.

After the image data was transmitted, a recovery request packet (CQ) is sent from the terminal A to the switch network Further, the switch network sends a cut instruction packet (CI) to the terminal B. The terminal B recognizes the cut instruction came. Since the LCGN and LCN at this time indicate the printers connected so far, the process to finish the use of them is then executed. After this process is finished, a cut confirmation packet (CF) is sent to the switch network. Thereafter, the recovery confirmation packet (CF) is again sent to the terminal A, the reader A 20 on the transmitting side is completely returned to the initial state, the network is cut, and all of the transmission is finished FIG. 8A shows the flow in this case.

In the case where while data is being transmitted to the printer of the terminal B by use of the reader A 20 of the terminal A, other data is further transmitted to the terminal B by the reader N 22 of the terminal A, LCGN=0 and LCN=2 are allowed to correspond to the reader N 22 and another empty printer of the terminal B is allowed to correspond to LCGN=1 and LCN=1, so that the data transmission can be performed. Namely, in FIG. 8A, during the connection completion packet (CC) reception waiting at 802, the image data transmission waiting at 803, and the recovery confirmation packet (DF) reception waiting at 804, the interruption can be performed. In such an interruptible state, the originating call packet is sent from the transmission/reception control unit 64 and the call is set. After the call is set, the data which had previously been converted into the frame data by the transmission frame processor under control of the main unit 4 and has been stored in the transmission buffer 63 is transmitted to the packet switch network 13. During the transmission of the data read out by the reader N 22, the connection completion packet (CC) reception waiting, the image data transmission waiting and the like, the interruption can be also performed. In this interruptible state, the image data which has been stored in the transmission buffer 63 and has been read out by the reader A 20 is subsequently transmitted By repeating those operations, the frame data which had been stored in the transmission buffer 63 and has been read out by the readers A 20 and N 22 can be time-sharingly transmitted and the line can be effectively used. On the other hand, LCGN=0 and LCN=1 indicative of the reader A 20 and LCGN=0 and LCN=2 representative of the reader N 22 are added to the respective frame data, so that the packet switch network can discriminate from which one of the readers the data was sent.

Figure 8B:
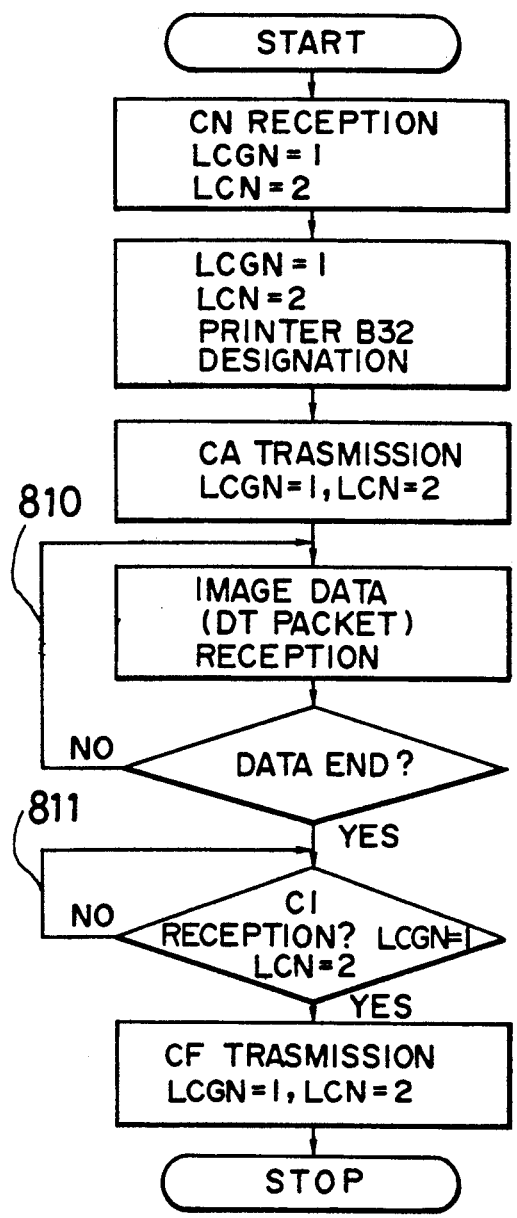
FIG. 8B is a flowchart showing the control upon data reception.

The case where while data is being transmitted from the terminal A to the terminal B, a terminating signal came from another terminal C will now be described. FIG. 8A shows the flow for transmitting the data to the printer of the terminal B by use of the reader A 20 by LCGN=0 and LCN=1 as mentioned above. In 802, 803, and 804, the interruption can be performed as described above. In this state, the terminating call packet (CN) sent from the packet switch network 13 is received. If LCGN=1 and LCN=2 are set in this CN packet, the printer N 32 is actuated by the table of FIG. 3 and the terminating call acknowledgment packet (CA) is sent to the packet switch network 13. After the call was set, the image data (DT packet) is received. This image data is temporarily stored into the reception buffer 65 and then stored in a predetermined area in the reception code page memory 67 through the reception frame processor 66. FIG. 8B shows a flow for reception of data in the terminal A from the terminal C. In this flow, during the data reception waiting at 810 and the cut instruction packet (CI) reception waiting at 811, the interruption can be performed and the interrupted procedure at 802, 803, or 804 in FIG. 8A is executed again.

Even when the interruption is being performed with each other, the LCGN and LCN which are peculiar to the packet are certainly added thereto, so that it is possible to discriminate which process is executed. In other words, if LCGN=0 and LCN=1, this means the transmission to the terminal B and corresponds to the process to transmit the original image data from the reader A 20. If LCGN=1 and LCN=2, this means the reception from the terminal C and corresponds to the process to output the image data to the printer B.

If the data from a plurality of terminals was sent to the terminal A from the packet switch network 13, the call is first set in the transmission/reception control unit 64. The image data which is time-sharingly sent is stored into the reception buffer 65. The respective frame data is stored into the reception code page memory 67 on the basis of the LCGN and LCN which were determined when the call was set. In this case, the data is stored into the different areas in dependence on from which printer the data is output. After the data was decoded by the encode/decode unit 5, it is restored in the memory 2 for every printer. The image can be output to the relevant printer, respectively.

Upon execution of the simultaneous operations for transmission and reception as explained above, high processing capabilities are needed for the line control unit 6, encode/decode unit 5, and the like of the terminal. A multi-programming system is used a the main unit 4.

When it is assumed that the terminal A in the foregoing embodiment has the line speed of e.g., 48 kbps and the terminnl on the distant side has the line speed of, e.g., 9.6 kbps, communications with five distant side terminals can be simultaneously performed. For example, the original image data can be received by two printers while transmitting the original image data from three readers. Since all of the combinations of the LCGN and LCN differ, those apparatuses can unconditionally and individually operate without overlapping the other processes.

Even if the distant side terminal has the same line speed, the reading operation of the reader, encoding, output to the printer, and the like are controlled by the main unit 4; therefore, just after the communication was finished, the frame data stored in the transmission buffer 63 can be promptly transmitted or received into the reception buffer 65.

As described above, according to the foregoing embodiment, by defining a plurality of readers and printers in correspondence to the LCGN and LCN, the transmission and reception can be overlappingly or simultaneously performed. The use efficiency of the apparatus can be improved. Wasted or unnecessary communication time can be eliminated.

In this invention, the apparatuses which can be connected to the main body of the data communication apparatus are not limited to the image processing apparatuses such as reader, printer, and the like. The other image processing apparatuses such as word processor, work station, and the like can be also connected.

The present invention is not limited to the foregoing embodiments but many modifications and variations are possible within the spirit and scope of the appended claims of the invention.

I claim:

1. A facsimile apparatus connected to a line of a packet switch network comprising:
    a plurality of generating means each for generating image data representing an original image;
    memory means for storing the image data from said plurality of generating means;
    transmitting means for converting said image data stored in said memory means into a plurality of packet data and for transmitting said packet data to said line; and
    control means for controlling said transmitting means such that a plurality of packet data of a first original image and a plurality of packet data of a second original image are transmitted to said line time-divisionally.

2. A facsimile apparatus according to claim 1, wherein said plurality of generating means include a plurality of readers, and wherein a plurality of readers has a logical channel group number (LCGN) and a logical channel number (LCN) and these numbers are set by reference to a table.

3. A facsimile apparatus according to claim 1, wherein said transmitting means includes packet processing means for converting the image data stored in said memory into packet data.

4. A facsimile apparatus according to claim 3, wherein said packet converting process which is executed by said packet processing means is a process for adding a header to the image data stored in said memory means and forming image data of a proper length.

5. A facsimile apparatus connected to a line of a packet switch network, comprising:
    receiving means for receiving image data representing original images consisting of a plurality of packet data transmitted through a line;
    memory means for storing the image data received by said receiving means;
    a plurality of reproducing means for outputting the image data stored in said memory means; and
    control means for controlling said receiving means such that both a plurality of packet data of a first original image transmitted from one terminal through a line and a plurality of packet data of a second original image transmitted from another terminal through a line are received time-divisionally.

6. A facsimile apparatus according to claim 5, wherein said plurality of reproducing means correspond to different terminals and output the image data stored in said memory means.

7. A facsimile apparatus according to claim 5, further comprising setting means for setting an identification number for each of said plurality of reproducing means.

8. A facsimile apparatus according to claim 7, wherein the identification number which is set by said setting means consists of a logical channel group number (LCGN) and a logical channel number (LCN) and these numbers are set by reference to a table.

9. A facsimile apparatus according to claim 5, wherein said control means includes converting means for receiving packet data from a line and for converting the received packet data into image data representing a respective original image.

10. A facsimile apparatus according to claim 5, wherein said plurality of reproducing means include a plurality of printers for recording the image data.

11. A facsimile apparatus connected to a line of a packet switch network, comprising:
    a plurality of generating means each for generating transmission image data representing a transmission original image;
    transmitting means for converting said transmission image data from said plurality of generating means into a plurality of packet data and for transmitting said packet data to a line;
    receiving means for receiving reception image data representing a reception original image consisting of a plurality of packet data transmitted through the line;
    a plurality of reproducing means for outputting the reception image data; and
    control means for controlling said transmitting means and said receiving means such that both transmission of a plurality of packet data and reception of a plurality of packet data are executed time-divisionally.

12. A facsimile apparatus according to claim 11, wherein each of said plurality of generating means has a logical channel group number (LCGN) and a logical channel number (LCN) and these numbers are set by reference to a table.

13. A facsimile apparatus according to claim 11, wherein each of said plurality of reproducing means has a logical channel group number (LCGN) and a logical channel number (LCN) and these numbers are set by reference to a table.

14. A facsimile apparatus according to claim 11, wherein said plurality of output terminals are printers each for outputting the image data.

15. A facsimile apparatus according to claim 11, wherein said plurality of generating means are readers each for reading a transmission original image and generating transmission image data.

* * * * *

UNITED STATES PATENT AND TRADEMARK OFFICE
CERTIFICATE OF CORRECTION

PATENT NO. : 5,025,497

DATED : June 18, 1991

INVENTOR(S) : YOSHIO YOSHIURA

It is certified that error appears in the above-identified patent and that said Letters Patent is hereby corrected as shown below:

Drawings
SHEET 6 OF 6

FIG. 8B, "TRASMISSION" should read --TRANSMISSION--.

COLUMN 7

Line 49, "include" should read --includes--.

COLUMN 8

Line 14, "spond" should read --sponds--.
    Line 29, "include" should read --includes--.

Signed and Sealed this

Twelfth Day of January, 1993

Attest:

DOUGLAS B. COMER

Attesting Officer      Acting Commissioner of Patents and Trademarks